Patented Sept. 12, 1939

2,172,997

UNITED STATES PATENT OFFICE 2,172,997

PAINT

Robert Seaver Edwards, Milton, Mass., assignor to Rumford Chemical Works, Rumford, R. I., a corporation of Rhode Island No Drawing. Application July 31, 1937, Serial No. 156,749

5 Claims. (Cl. 134—39)

This invention pertains to a composition of matter characterizable as an active white paint pigment extender of the nature of a non-catalyzed gypsum cement which is catalyzable in combination by usual paint pigments to form a cementitiously toughened oil film or coat.

Among the well known white pigments used in paint manufacture are—white lead, zinc oxide, titanium (white) dioxide, antimony oxide, lithopone, basic sulphate of lead and carbonate of lead or trade-name combinations of the above pigments, such as "Titanox". Other so-called white inert pigments or extenders are also in common use, generally blended with the white pigments named above—these are barytes, blanc fixe, gypsum (terra alba) asbestine, Paris white (whiting), China clay, magnesium silicate, and silica. There also are many colored pigments in use for blending with the above white pigments to secure yellow, blue, green, red, brown and black effects.

The finer the state of sub-division of the pigments which are used in paints, the greater the covering or hiding power or the so-called "strength" of the color.

One of the important features of my active paint pigment extender is its capability of production in a very finely divided and uniform particle size so that it imparts highly desirable covering, hiding and spreading capacity to the pigment combination.

When an ordinary paint is applied, the turpentine and drier being volatile, evaporate from the painted surface leaving behind the pigment and oil mixture as a wet coating. This coating gradually dries into an elastic, solid film owing to the polymerizing of the oil film by absorbing oxygen.

My concept includes toughening such a film by what I have termed an active paint pigment extender which sets and hardens as a cement, the other pigments serving to induce setting properties in the cement; and the solidified oils acting as a binder of the pigments and cemented pigments, holding them in place by the formation of a tougher and more resistant cemented paint film which has superior bonding, covering, wearing and adhering qualities.

A white paint or other colored paints in which the pigment blended combinations contain substantial amounts of my white active pigment extender show remarkable wearing qualities, non-chalking and great toughness with resistance to abrasion.

One of the many uses for a paint having the particular characteristics acquired by the use of my active paint pigment extender is in the production of paint for concrete and other highways, cross-walks, etc. for which use a tough and durable paint is specified. The advantages in using a paint formula containing a substantial amount of my active pigment extender are obvious, because the wearability and resistance to abrasive attack from automobile tires, wheels, etc. as well as from the elements is prolonged with the result that less repainting of stripe is required. As the labor item for such painting requirements is a particularly heavy charge, a paint which will withstand such severe use without the necessity of as frequent application as the great majority of traffic paints now in use has long been an unfilled need in this field.

Paint for outdoor use, especially a white paint, is difficult to make with long lasting qualities, especially non-chalking, non-checking or cracking when exposed to varying climatic conditions. By the proper use of my active paint pigment extender in replacing substantial amounts of zinc oxide and titanium dioxide, which are the usual pigments used in white paints exposed to weathering conditions, a superior white paint can be made and chalking, checking and cracking greatly reduced if not entirely eliminated.

According to my invention I use a finely divided cementitious material secured from dehydrated gypsum or anhydrite source which has been treated as in my prior Patent No. 2,090,625 so as to substantially eliminate anhydrite recrystallization and dissociation when calcined at temperatures between 1800° and 2300° F. Such a material exhibits certain physical characteristics valuable in a paint mixture, as follows:—

It is of high specific gravity and density, and non-porous structure, with uniformly inhibited crystal structure, and especially, it is of increased hardness and toughness as compared with untreated hydrous or anhydrous gypsum calcined at usual temperatures. Being in the form of a non-dissociated and inhibited crystalline particle, it can be ground to exceedingly fine and uniform particle size which greatly enhances its blending and dispersibility when used in combination with other pigments and their usual vehicles.

Due to this inhibition of particle size, my active pigment extender can be ground and air separated into uniform particles as fine as one micron or less, in which condition pigment combinations containing substantial amounts of my active pigment extender when properly mixed as a paint remain in thorough suspension with no settling or setting action of the active pigment extender while stored in various containers.

My active pigment extender replaces a considerable part of the standard white and more expensive pigments called for in a great variety of paint specifications and in itself has active pigment qualities.

As illustrative of characteristic desirable proportions I will herein set forth certain paint formulae or recipae in which my novel active pigment extender replaces certain of the standard white paint pigments commonly used in conventional paint mixtures.

PAINT FORMULAE (Using white active paint pigment extender)

No. I

| | Percent |
|---|---|
| White active pigment extender | 50 |
| TiO$_2$ (titanium dioxide) | 10 |
| Asbestine | 5 |
| ZnO (zinc oxide) | 20 |
| White basic carbonate or sulphate of lead | 15 |

The above pigments ground in raw linseed and China-wood oil and small amount of turpentine and drier. This paint is made containing 65% of pigments and 35% of the vehicle.

No. II

*Lead-free white paint*

| | Percent |
|---|---|
| White active pigment extender | 50 |
| TiO$_2$ (titanium oxide) | 15 |
| ZnO (zinc oxide) | 30 |
| Asbestine | 5 |

The above paint mixture ground in raw linseed and China-wood oil and small amount of turpentine and drier. This paint is made containing 65% of pigments and 35% of the vehicle.

No. III

*Green paint for exterior use*

| | Percent |
|---|---|
| White active pigment extender | 60 |
| Titanium dioxide | 5 |
| White basic carbonate of sulphate of lead | 35 |
| Chrome green | 2 to 3 |

The above pigments ground in raw linseed and China-wood oil with small amount of turpentine and drier. This paint is made containing 65% of pigments and 35% of the vehicle.

Traffic and road striping paint

While the character of the vehicle used in traffic paint is far more important than the pigments used in such paints, the use of zinc oxide and titanium pigment together with my white active pigment extender with a small amount of siliceous base forms a cementitious, abrasive-resisting combination which is most desirable in a traffic paint.

The vehicle of such paint is composed of 40% non-volatile and made of approximately 11 to 12 gallons of China-wood oil and 7 to 8 gallons of linseed oil per 100 pounds of phenolic resin, thinned with naphtha and drier to set "to touch" at 86° F. in 15 minutes and dry in 1 hour to 1 hour and 15 minutes at 86° F.

The composition of such a paint is made up containing 65% pigments and 35% vehicle.

Thus in the practice of my invention, I replace a substantial amount, say from 30 to 60% and in some instances up to 75 or 80% of the ordinary so-called white paint pigments or combinations of such pigments with my active white pigment extender.

Although I have described my invention as an active white pigment extender for oil paint mixtures, I wish to point out that its use is not confined to oil paints, but that it may also be used to great advantage in cold water paints and kalsomines in which casein or glue is the usual hardening medium.

By the term "pigment base" as used in the claims is meant pigment capable of catalyzing my active pigment extender, such as white lead, zinc oxide, titanium oxide, antimony oxide, lithopone, basic sulphate and carbonate of lead, or combinations of the same, in which combinations small percentages of the following inert pigments may be used, such as barytes, blanc fixe, gypsum (terra alba) asbestine, Paris white (whiting), China clay, magnesium silicate, and silica, and not such inert colorings as siennas, ochres, umbres and the like which are incapable of being reacted with my pigment extender.

What I therefore claim and desire to secure by Letters Patent is:

1. A paint, comprising a pigment vehicle, and a pigment base and an active pigment extender incorporated in said vehicle, said extender consisting of a non-catalyzed, non-dissociated calcium sulphate produced at temperatures between 1800° F. and 2300° F. and having the property of reacting with said pigment base on application of the paint to form a cementitious paint film and itself constituting a pigment enabling the amount of pigment base which would normally be used in the mix to be substantially reduced.

2. A white paint, comprising a pigment vehicle, a white pigment and a white active pigment extender incorporated in said vehicle, said extender consisting of a non-catalyzed, non-dissociated calcium sulphate produced at temperatures between 1800° F. and 2300° F. and having the property of reacting with said pigment on application of the paint to form a cementitious paint film and itself constituting a part of the white color factor of the paint.

3. An abrasive-resisting traffic paint, comprising a vehicle, and zinc oxide and titanium dioxide pigment and an active pigment extender incorporated in said paint, said extender consisting of a non-catalyzed, non-dissociated calcium sulphate with a small amount of siliceous base, said cement being derived from a gypsum or anhydrite source which was treated prior to calcination at temperatures between 1800° F. and 2300° F. to substantially eliminate anhydrite recrystallization and dissociation and having the property on application of the paint of being catalyzed by said pigment to form a cementitious abrasive-resisting combination paint film.

4. A paint mix, comprising a vehicle, a pigment, and an active pigment extender interchangeable with the pigment base and incorporated in said paint mix, said extender consisting of a non-catalyzed, non-dissociated calcium sulphate derived from a gypsum or anhydrite source which was treated prior to calcination at temperatures between 1800° F. and 2300° F. to substantially eliminate anhydrite recrystallization and dissociation and having the property on application of the paint to the surface to be painted of being catalyzed by said pigment to form a toughened paint film.

5. That step in the process of making a paint mix, which consists in grinding with a pigment base and a pigment vehicle an active pigment extender consisting of a non-catalyzed, non-dissociated high temperature calcium sulphate of inhibited crystal form and increased crystal hardness which by crystal hydrolyzation combines with the pigment base to form a densified cementitious paint film upon application to the surface to be painted.

ROBERT SEAVER EDWARDS.